H. S. FIRMAN.
Apparatus for Rendering Fats and Deodorizing the Gases.
No. 5,643. Reissued Nov. 4, 1873.
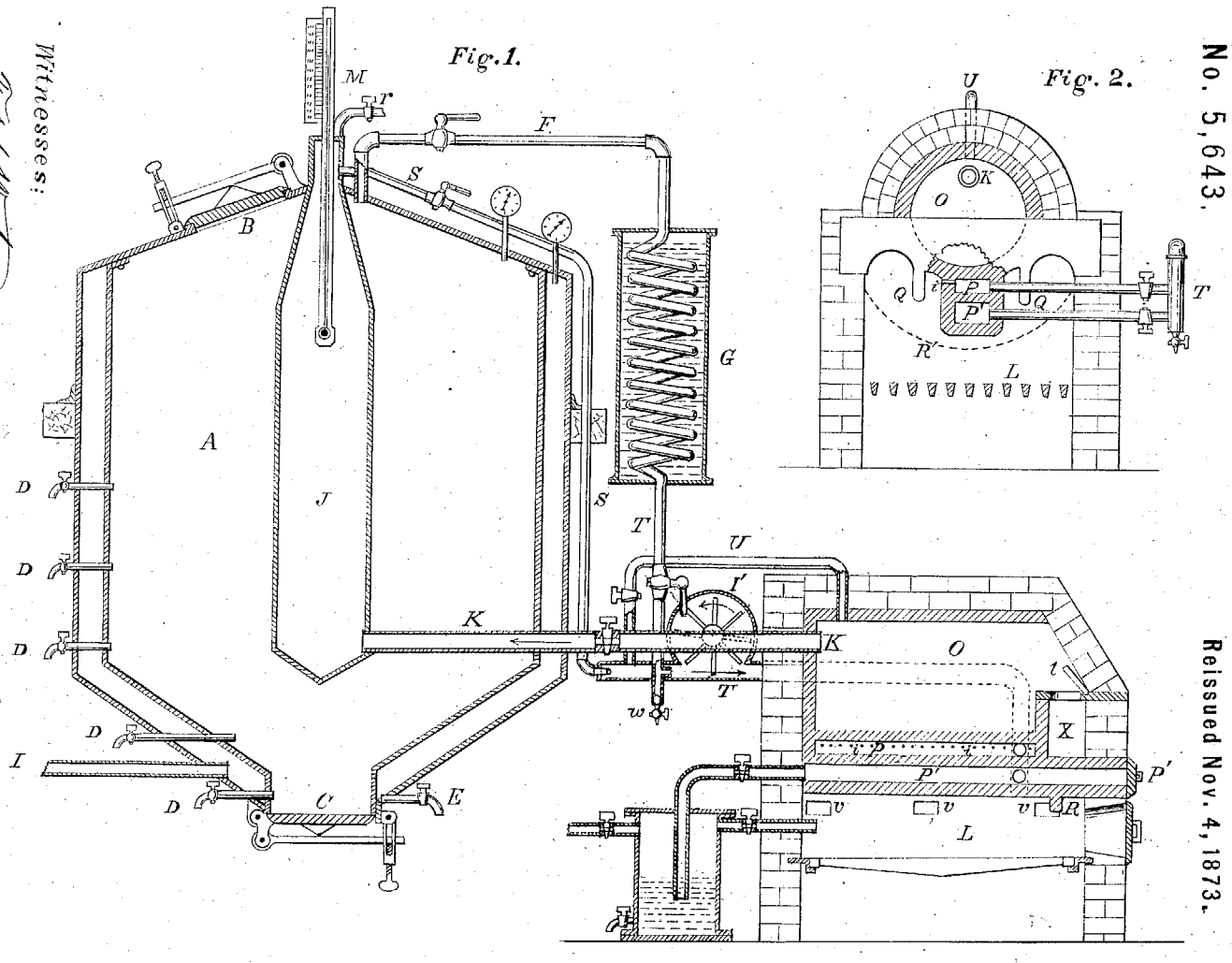
Witnesses:
Thos. A. Weston.
Charles M. Higgins
Inventor
Henry S. Firman
Per Burke & Fraser, attys.

UNITED STATES PATENT OFFICE.

HENRY S. FIRMAN, OF NEW YORK, N. Y.

IMPROVEMENT IN APPARATUS FOR RENDERING FATS AND DEODORIZING THE GASES.

Specification forming part of Letters Patent No. 136,827, dated March 18, 1873; reissue No. 5,643, dated November 4, 1873; application filed October 14, 1873.

*To all whom it may concern:*

Be it known that I, HENRY S. FIRMAN, of the city, county, and State of New York, have invented certain new and useful Improvements in Rendering Apparatus for Rendering Tallow, Lard, and all Kinds of Animal Fats and Tissues, of which the following is a specification:

My invention is a rendering apparatus, which, from the peculiar construction, combination, and arrangement of its parts, is adapted to employ, advantageously, steam and hot air in combination with each other. Its novelty consists, mainly, in the employment, in connection with a steam rendering-tank, of an internal hot-air drum or chamber having independent means of heating it and regulating its temperature.

The details of construction and the manner of operation will be fully described hereinafter.

Figure 1 is a central vertical section of my improved rendering apparatus and the air-heating furnace; also showing the gas-seal as connected therewith when the apparatus is employed for the production of illuminating-gas; Fig. 2, a transverse section of the furnace on the line *y y* of Fig. 1, being partially broken to show the interior of perforated pipe P and retort P′.

The accompanying drawing represents a steam-tight cylinder or digester, A, made of boiler-iron, with a lining throughout, except at the top, (or, if preferred, it may be lined at the top,) of the same material, which makes it equivalent to a jacketed tank; but, if it is preferred to admit the steam directly into the interior of the cylinder, the lining may be dispensed with, and the ordinary Wilson tank may be employed, the latter being simply a single steam-tight iron cylinder or digester. This digester may be set in brick-work; but, by preference, I cover it with felt or composition, to prevent loss of heat by radiation. It is provided with a filling-hole, B, at the top, and with a discharging-hole, C, at the bottom. It is also suitably provided with cocks D D D D for drawing off the melted fat and water, and with a cock, E, for drawing off condensed water from the jacket. I is the pipe by which the steam from the boiler is admitted into the jacket when the double cylinder is used, and into the inside of the digester when the single tank is used. At or about the center of the digester I place a heated-air drum, J, communicating, by the pipe K, with furnace L, by which pipe the drum is supplied with heated air. I provide the heated-air drum with a thermometer, M, by means of which the temperature within can at all times be ascertained by external observation. My mode of destroying the foul gases evolved during the process of rendering is to pass them through the pipe F into a condenser, G, which is provided with a suitable coil immersed in water for partial condensation, and thence lead them into the furnace L, discharging them through a perforated delivery retort or pipe, P, into the fire to be burned. In some cases—that is, whenever the character of the material under treatment will warrant, and when, for any reason, it may be desirable—instead of delivering the vapors through the perforated retort or pipe P, I provide, adjacent thereto, a closed retort, P′, which then makes it equivalent to an ordinary gas-retort. I then heat this retort to a suitable temperature, and thus convert the partially-condensed foul gases and vapors from the rendering apparatus into gas for illuminating or heating purposes; and when I desire to give to the gas thus manufactured a higher degree of illuminating or heating power, I combine with these gases and vapors in the retort a suitable proportion of tallow, grease, scrap, wood, oil, or any material from which gas for illuminating or heating purposes may be manufactured. By these means, the vapors evolved in the digester may be utilized instead of being merely consumed in the furnace. I also place charcoal, or its equivalent, in the retort, for the purpose of deodorizing the noxious gases and vapors, as well as to facilitate the manufacture of the gas for illuminating purposes. I place, at a suitable point between condenser G and furnace L, a fan-blower, I, or other equivalent device, to facilitate and hasten the removal of vapors and gases from the digester, and force them into the discharging-pipe P to be consumed in the furnace; also, to create a circulation of air through the heated-air drum J by exhausting a portion through the pipe S, the place of which is immediately filled by the expansion of that contained in the air-chamber O in the furnace. The delivery-pipe P and retort P′ I make either of fire-clay or its equivalent, or of iron, and provide perforations *i i* in the former, in order to distribute the gases in small jets, and insure a proper presentation thereof to the fire, so as to insure their perfect combustion and the complete destruction of all noxious and offensive odors. The destruction of the noxious gases may be effected equally well by leading them into the boiler-furnace; but, by preference, I use for this purpose the same furnace which I employ for heating the air supplied to the air-drum J. This furnace L is constructed in the lower part—that is to say, the ash-pit, grate-bars, and flues—in the ordinary manner; but the upper part I construct as a heating-chamber, in which the air supplied to the drum J is heated to a suitable temperature for the purpose required. This chamber may be made of fire-clay or equivalent material, or of iron, and may be of square or other form, but is preferably cylindrical, and covers the entire fire-space over the furnace, except a space, X, left in front of the air-flue. A pipe, K, conducts the hot air to the drum J. Fresh air is supplied to the heating-chamber by the blower I, or it is taken directly from the fire-chamber L of the furnace when the fire is in such a condition as not to evolve smoke. In this case the damper *t* is kept open, allowing the heated air and gases of combustion to ascend through the flue X and enter the chamber O. The expansion of the air, by heating, in the chamber O will generate sufficient force to drive it into the drum J; but I provide for its regular supply thereto, and a steady circulation through the same, by means, first, of pipes S from the top of the drum, through which the action of the blower slowly exhausts a portion of the contents of the drum, the equivalent of which will be constantly flowing in from chamber O to maintain an equilibrium; secondly, by allowing a small part to escape, by opening stop-cock *r*, through a pipe communicating with the chimney, causing an inflow from the chamber O to maintain the uniformity of temperature. I also introduce a pipe, U, which takes hot air from the chamber O, and leading it into the pipe T for mixture with the condensed gases before they enter the furnace, thereby insuring their perfect combustion. On the bottom or lowest part of the cylindrical air-heater O, I place my perforated discharge-pipe P, through which the foul gases are delivered into the fire or closed retort for making the illuminating-gas, as previously described. On each side, parallel with and a short distance from this retort and perforated pipe in chamber of the furnace, I place a downwardly-projecting molding or curtain, Q, leaving an open space between. These are for the purpose of checking the gases when issuing from the perforated pipe into the furnace to be burned. These moldings or projections may be increased in number and size, if desired. At the front end of the cylinder I drop a curtain or molding, preferably of a semicircular shape, or approximating to that of the heater, it being shown in cross-section at R, Fig. 1, and its form and position indicated by the dotted lines R′, Fig. 2. The office of this curtain is to check the flame and products of combustion, and cause them to circulate around the under surface of the heater before escaping, either by the ordinary flues *v v v* or the air-passage X. The pipe S is connected with the heated-air drum in the digester, and has its terminal end or nozzle *s* inserted in the pipe T, through which the foul gases are fed to the furnace, the suction of the blower I′ acting as an exhaust on the pipe S also. A drip-cock, *w*, is provided to the pipe T for the withdrawal of any water which may be condensed therein.

It will be observed from the foregoing description that the jacket or tank is heated by means independent and distinct from those employed to heat the drum J. It is essential in my rendering process that the inside drum or chamber should be of such form and so arranged as to enable the operator to secure, at will, either a high or low temperature, as the case may require, without reference to the temperature or pressure in the jacket, or in the single tank when that is used, this result being readily accomplished by adapting the hot-air drum to be regulated, as to its temperature, independently of the jacket or tank, as desired.

Under the plan or arrangement heretofore in use, this result was impracticable, if not impossible, for the reason that the drum or chamber was so arranged and placed, and so connected with other parts of the apparatus, they merely passing through the digester from top to bottom, or from side to side, that the temperature in the drum or flue could not be materially different from that in the jacket of the steam apparatus, or from that in the outside chamber or flue of the hot-air apparatus, there not being in either case any special or independent means for regulating the temperature in the said drum or flue. Another essential point in my process is, that this drum or chamber should be three or four times larger at the bottom than at the top, and properly proportioned.

I am aware that both flues and drums have been heretofore used in both steam and hot-air rendering apparatus; but these were cases where either hot air or steam was alone employed, and not, as in my process, in combination. I do not claim a flue passing through a rendering apparatus.

It will be observed also that the material treated is acted upon by radiated heat from the inclosing steam-jacket, which is employed in connection with radiated heat from an internal hot-air chamber.

The employment of different kinds of heat, in the manner described, produces new and valuable results; the tallow having the color, grain, and keeping qualities of that obtained when hot air is used exclusively, while the usual danger of burning is almost entirely avoided.

Having thus fully described my invention, what I claim as new, and desire to secure by Letters Patent, is—

1. In combination with a steam rendering-tank, the internal hot-air drum or chamber, and the independent means for heating it and regulating its temperature, substantially as described.

2. The combination of the centrally-located drum J, the connecting-pipe K, having a suitable regulating device, and the independent furnace L, as described.

3. The hot-air chamber or drum inside of a rendering apparatus, having a tube passing from the furnace into the lower end of said chamber or drum, and a pipe passing from the top of said hot-air chamber or drum into the stack or chimney, for the purpose of creating a circulation of air through the hot-air chamber or drum, substantially as described.

4. The moldings or projections, or their equivalents, adapted to check the gases at the instant of their delivery into the fire, to aid and facilitate their combustion, as herein shown and described.

5. The arch or upper portion of the furnace formed with one or more downward or downwardly-inclined projections, Q Q, substantially as and for the purpose set forth.

6. The outlet-pipe *v*, located at or near the top of the heated-air drum, and connecting the same to the chimney or stack, as described.

7. The employment of the radiated heat from an inclosing jacket heated by steam, in combination with the radiated heat from an internal hot-air chamber, substantially as described.

8. In combination with the furnace L and heating-chamber O, the hot-air flue X for conveying the heated air and gaseous products of the furnace L, as and for the purpose set forth.

9. The retort or delivery pipe P, either perforated or close, arranged along the top and center of the furnace L, as and for the purpose set forth.

10. Mixing hot air from the drum J with the vapors and gases evolved in the rendering-tank before burning in the furnace, as set forth.

11. The shield or curtain R, in combination with the furnace L and heating-chamber O, for checking the flames and heated products until perfect combustion has occurred, substantially as set forth.

12. The arrangement of the pipe U for withdrawing air from the heating-chamber O, and mingling it with the condensed vapors and gases before burning the same, substantially as set forth.

13. The use of charcoal, or its equivalent, in the retort, as a deodorizer of the noxious gases and vapors from a rendering apparatus, as described.

In witness whereof I have hereunto signed my name in the presence of two subscribing witnesses.

H. S. FIRMAN.

Witnesses:
GEO. S. NICKOLLS,
M. P. SANGUINET.